United States Patent
Föhl

[11] Patent Number: 6,030,036
[45] Date of Patent: Feb. 29, 2000

[54] VEHICLE SEAT WITH GAS BAG LOCATED IN THE BACK REST

[75] Inventor: Artur Föhl, Schorndorf, Germany

[73] Assignee: TRW Occupant Restraint Systems GmbH, Alfdorf, Germany

[21] Appl. No.: 08/786,880

[22] Filed: Jan. 23, 1997

[30] Foreign Application Priority Data

Feb. 2, 1996 [DE] Germany ............ 296 01 798

[51] Int. Cl.⁷ .................................................. B60N 2/42
[52] U.S. Cl. ........................ 297/216.14; 280/730.1; 297/216.12
[58] Field of Search ............ 297/216.12, 216.13, 297/216.14; 280/730.1

[56] References Cited

U.S. PATENT DOCUMENTS

| | | | |
|---|---|---|---|
| 2,973,029 | 2/1961 | Schlosstein | 297/216.12 |
| 3,420,572 | 1/1969 | Bisland | 297/216.12 X |
| 3,655,217 | 4/1972 | Johnson . | |
| 3,703,313 | 11/1972 | Schiesterl et al. . | |
| 3,779,577 | 12/1973 | Wilfert . | |
| 3,953,049 | 4/1976 | Surace et al. | 280/730.1 |
| 5,316,336 | 5/1994 | Taguchi et al. | 280/730.1 X |
| 5,458,396 | 10/1995 | Rost | 297/316.13 X |
| 5,505,487 | 4/1996 | Brown et al. | 280/730.1 |
| 5,556,129 | 9/1996 | Coman et al. | 297/216.12 X |

FOREIGN PATENT DOCUMENTS

| | | |
|---|---|---|
| 0593845 | 4/1994 | European Pat. Off. . |
| 2116092 | 7/1972 | France . |
| 2046265 | 3/1971 | Germany . |
| 2037565 | 2/1972 | Germany . |
| 29504287 | 5/1995 | Germany . |
| 4243647 | 8/1992 | Japan . |
| 0593845 | 4/1994 | Japan . |
| 6127331 | 5/1994 | Japan . |
| 6247249 | 5/1994 | Japan . |
| 09132098 | 5/1997 | Japan . |

Primary Examiner—Peter M. Cuomo
Assistant Examiner—Stephen Vu
Attorney, Agent, or Firm—Tarolli, Sundheim, Covell, Tummino & Szabo L.L.P.

[57] ABSTRACT

A vehicle seat with a back rest comprises a gas bag, which is located in the back rest in a folded state, and a gas source to inflate the gas bag. It further comprises an accomodation at the upper side of the back rest and a supporting casing, which is inserted in the accomodation.

To provide a vehicle seat with a restraint system, which largely prevents relative movements between the head of the vehicle occupant and his upper body in the event of a rear end impact, the gas bag emerges on activation of the gas source at about the height of the head of the vehicle occupant, with the supporting force being provided by the supporting casing.

10 Claims, 3 Drawing Sheets

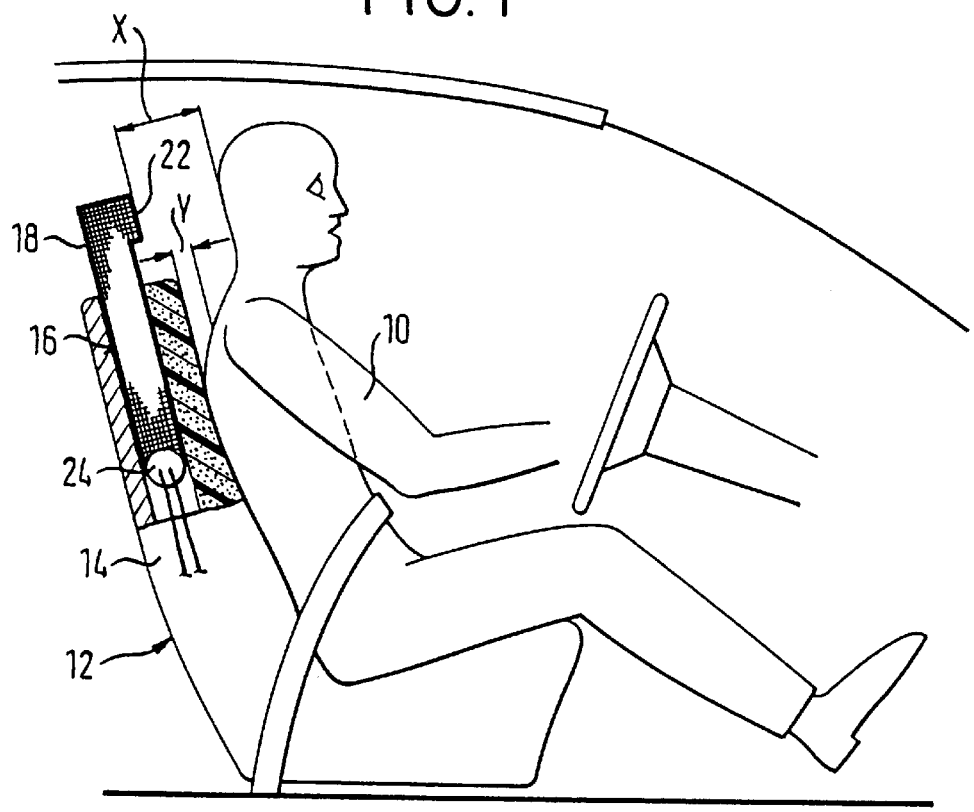
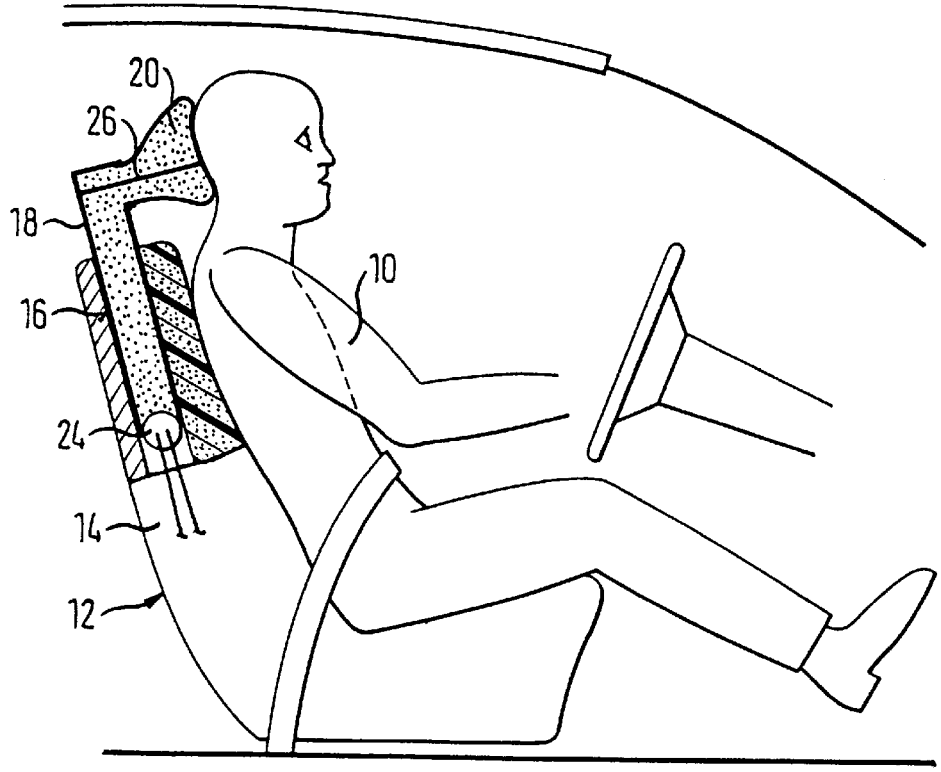

VEHICLE SEAT WITH GAS BAG LOCATED IN THE BACK REST

BACKGROUND OF THE INVENTION

1. Field of the Invention

The invention relates to a vehicle seat with a gas bag located in the back rest which can be inflated by means of a gas source.

2. Description of the Related Art

Vehicle seats are usually fitted with headrests, whose function is to provide rearward support for the head of the vehicle occupant in the event of a rear-end impact. In a normal sitting position, however, a relatively large distance remains between the headrest and the head of the vehicle occupant, so that in the event of a rear-end impact, first the head of the vehicle occupant is flung backwards in relation to the vehicle seat until it strikes the headrest. According to the latest findings, many injuries in the region of the cervical vertebrae can be attributed to this head movement in the initial phase of the impact.

A gas bag located in the back rest of a vehicle seat has already been proposed in the U.S. Pat. 3,655,217; this gas bag, however, expands towards the roof of the vehicle when activated, and cannot support any major forces transverse to its direction of expansion.

SUMMARY OF THE INVENTION

The present invention provides a vehicle seat fitted with a restraint system which largely prevents relative movements between the head of the vehicle occupant and his upper body in the event of a rear-end impact.

In accordance with the invention, this is achieved by a vehicle seat with a back rest, comprising a gas bag, which is located in the back rest in a folded state, and a gas source to inflate the gas bag. It further comprises an accomodation at the upper side of the back rest and a supporting casing, which is inserted in the accomodation. The gas bag emerges on activation of the gas source at about the height of the head of the vehicle occupant, with the supporting force being provided by the supporting casing.

In a first embodiment, which is characterised by simplicity and low cost, the supporting casing is firmly fixed in the shaft of the back rest and projects over the upper edge of said back rest. The gas bag is dimensioned so that in its inflated state it forms a supporting surface for the head of the vehicle occupant, said surface extending to a sufficient height to guarantee good effectiveness for greatly differing heights. In this embodiment, a height adjustment facility for the supporting casing is unnecessary.

Alternatively, the supporting casing can be vertically adjustable in the back rest, with the vertical movement preferably being dependent on the height of the vehicle occupant. In this embodiment, the volume of the gas bag can be kept smaller. A further advantage is that in its normal resting position, the supporting casing can be fully hidden inside the back rest, without projecting above the upper edge, so that there are no restrictions at all on visibility to the rear.

The expansion of the gas bag is preferably restricted by internally arranged arresting belts to keep the forces acting as low as possible when the gas bag touches the head of the vehicle occupant.

Further characteristics and advantages of the invention can be seen from the following description of several embodiments and from the drawing to which reference is made.

BRIEF DESCRIPTION OF THE DRAWINGS

FIG. 1 shows a partly cutaway, diagrammatic side view of the vehicle seat in accordance with the invention, in normal resting position;

FIG. 2 shows the vehicle seat with activated gas bag;

DESCRIPTION OF THE PREFERRED EMBODIMENTS

Figure 3:
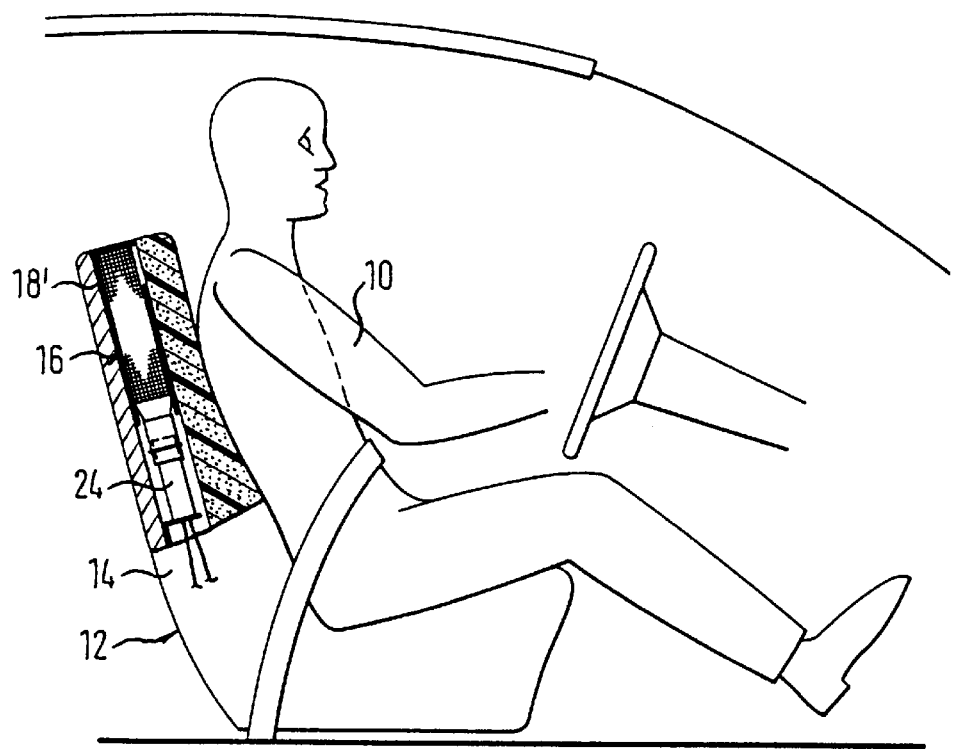
FIGS. 3 and 4 show appropriate views of a second embodiment.

FIG. 1 shows a vehicle occupant 10 on a vehicle seat 12 in a normal sitting position. The back rest 14 of the vehicle seat 12 is fitted with a shaft 16 which is open at the upper end and in which a supporting casing 18 has been inserted. This supporting casing 18 projects over the upper edge of the back rest 14 and extends to about the height of the head of a vehicle occupant of average height. The inside of the supporting casing 18 contains a folded gas bag, which is shown in FIG. 2 in inflated condition and which has been given the reference number 20. On the side of the supporting casing 18 facing the head of the vehicle occupant, said supporting casing 18 has a window to allow the gas bag to pass through, said window being hidden by a cover 22, which can be teared open. In the back rest 14, below the supporting casing 18, a gas generator 24 is located, for example a pyrotechnical gas generator which is ignited electrically. The gas bag 20 is inflated by the compressed gas produced by the gas generator 24, so that it expands in the direction of the head of the vehicle occupant 10, as shown in FIG. 2.

The protective effect achieved with this design of the vehicle seat will now be explained in more detail. As can be seen from FIG. 1, in a normal sitting position, a distance X, which can be of considerable magnitude, remains between the head of the vehicle occupant and the surface of the supporting casing 18 facing it. Furthermore, a distance which in FIG. 1 is referenced as Y remains between the shoulders of the vehicle occupant and the back rest. In the event of a rear-end impact, the gas generator 24 is activated by a controller unit according to predefined actuation criteria. The gas bag 20 is inflated and escapes through the window of the supporting casing 18, tearing open the cover 22. The vehicle occupant 10 is pressed against the back rest 14 by his mass inertia, whereby distance Y must be overcome and distance X also becomes smaller. Before a pivotal movement of the head of the vehicle occupant can occur backwards in relation to the upper body, the gas bag 20 is fully inflated and forms a support area which makes contact with the rear side of the head and which supports the head. On the opposite side, the supporting forces are absorbed by the supporting casing 18.

As can be seen from FIG. 2, the interior of the gas bag 20 contains arresting belts 26, which restrict the expansion of said gas bag in the direction of the head of the vehicle occupant. These arresting belts 26 preferably take effect in the centre of the support area of the gas bag, so that a supporting cushion for the head, which is shaped according to the form of the head, is formed on both sides of the arresting belts. By means of this adaptation in the shape of the cushion, the head of the vehicle occupant is kept in a stable position during the impact event.

The hardness of the gas bag 20 is matched to the upholstery of the back rest 14, so that the upper body of the vehicle occupant is pressed into the back rest 14 to the same extent as the head is pressed into the gas bag 20. This matching prevents a relative movement between the head and the upper body of the vehicle occupant in the course of the accident event. In order to achieve the intended, relatively high degree of hardness of the gas bag 20, said gas bag is preferably manufactured from an internally coated textile material.

In the embodiment shown in FIGS. 1 and 2, the supporting casing 18 is firmly fixed in the back rest 14 of the vehicle seat. The gas bag 20 is dimensioned so that its support area covers a sufficiently great vertical range in order to guarantee good effectiveness of support for all possible sizes of vehicle occupant.

Figure 4:
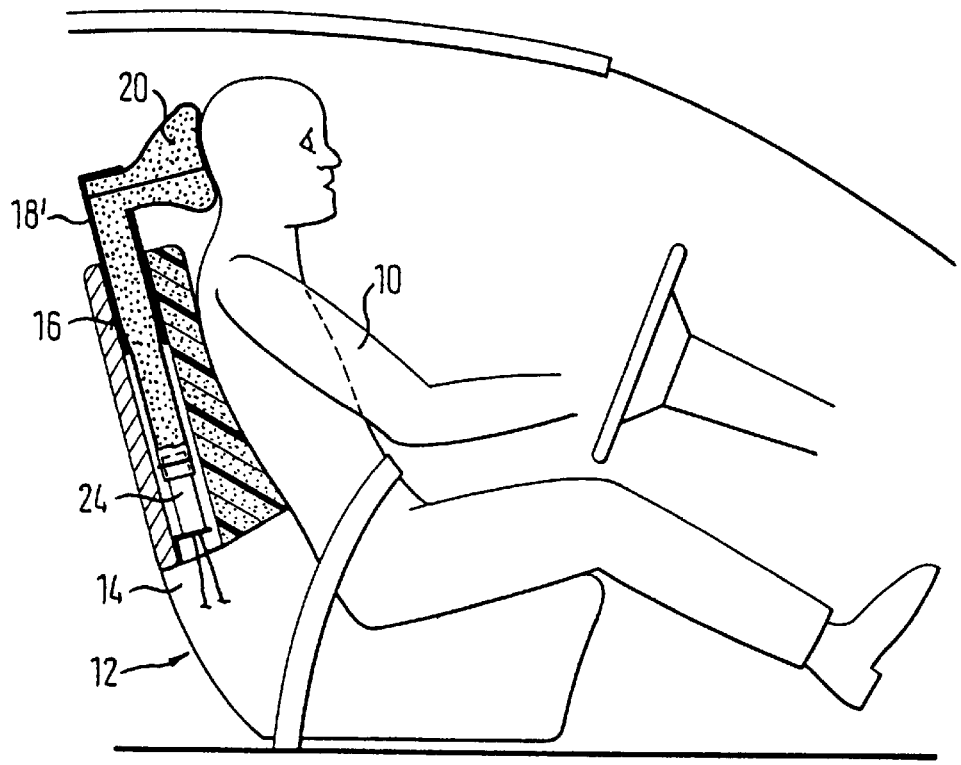
Figure 5:
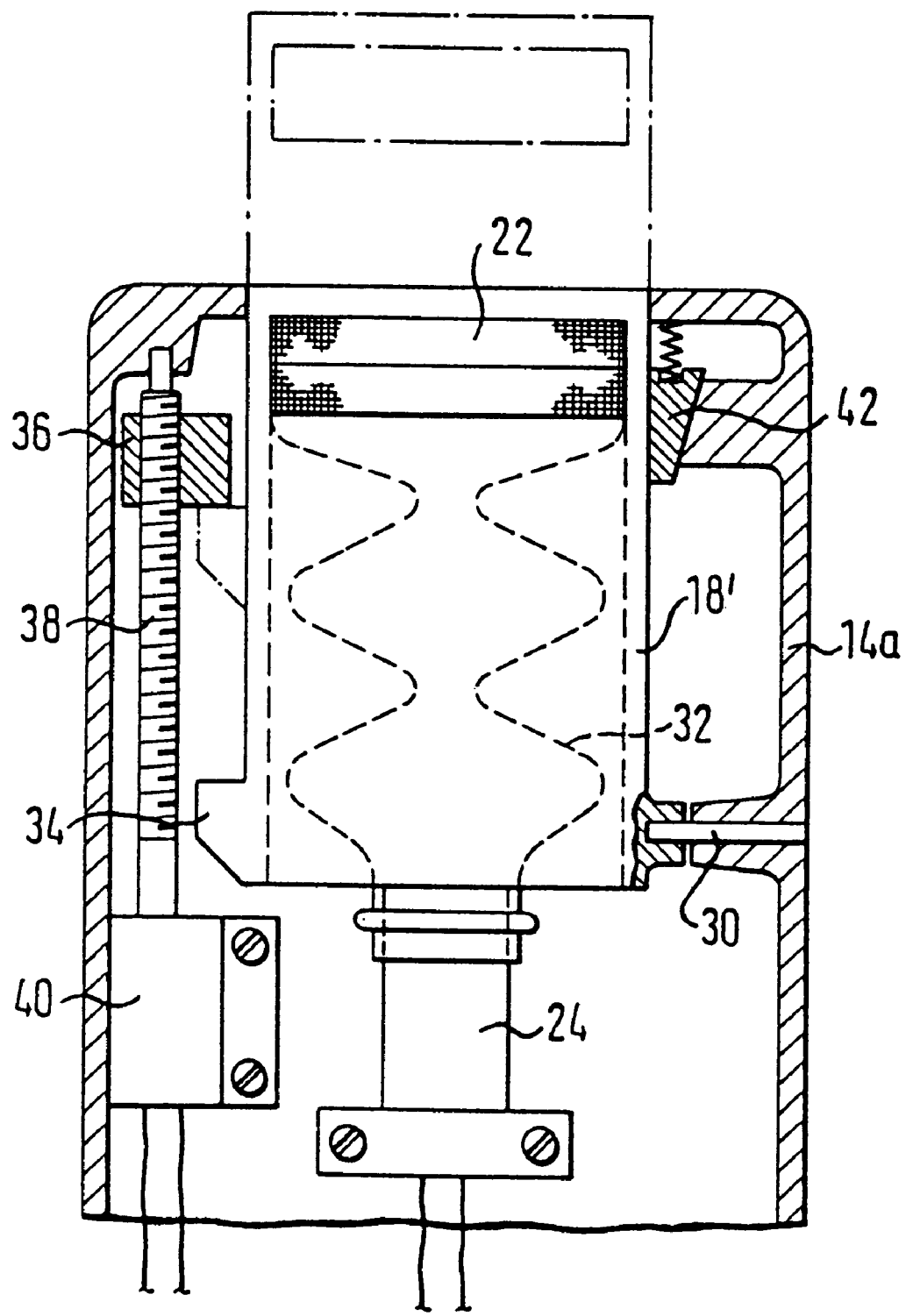
FIG. 5 shows the back rest of a vehicle seat in accordance with the second embodiment in a simplified cross-sectional view.

In the embodiment shown in FIGS. 3, 4 and 5, on the other hand, the supporting casing 18' is arranged in the back rest 14 of the vehicle seat and can be pushed up vertically. In the normal resting position shown in FIG. 3, the supporting casing 18' is located completely inside the back rest, and does not project above the upper edge of said back rest. It can be completely hidden by the covering material of the back rest. When the gas generator 24 is activated, the supporting casing 18' is first pushed upwards by the pressure of the gases produced, with the seat covering material tearing at a predetermined tearing line provided for. The supporting casing 18' now emerges from the back rest 14 until its upward movement is restricted by a limit stop. The gas bag 20 can now emerge from the supporting casing 18' as in the embodiment described above. The mode of functioning of this embodiment is in principle the same as that described above, however the gas bag can be of a smaller volume if the vertical movement is adapted to the size of the vehicle occupant in accordance with the preferred embodiment. The support area of the gas bag can then cover a smaller vertical range.

FIG. 5 shows details of the second embodiment, which has so far only been explained schematically. The normal resting position of the supporting casing 18' is drawn using continuous lines, and the extended state is represented with dotted lines.

In the interior of the frame 14a of the back rest a shaft is formed, which is open at the upper end and in which the supporting casing 18' has been inserted so that it can be pushed up vertically. In its resting position, the supporting casing 18' is retained by means of a shearing pin 30 on the frame 14a of the back rest. The gas generator 24 is connected to the receptacle space for the folded gas bag inside the supporting casing 18' by means of a flexible, bellows-type hose pipe 32. On the side opposite the shearing pin 30, the supporting casing 18' is fitted with a stop boss 34. This stop boss 34 works together with a vertically adjustable limit stop 36.

The vertical adjustment of the limit stop 36 is effected by means of a threaded spindle 38, which is driven by a servo motor 40. The servo motor 40 is controlled by a device which is in a position to determine the height of the vehicle occupant and to adjust the limit stop 36 accordingly. A simplified version with manual control is, however, also possible.

Finally, the supporting casing 18' is fitted with a return stop, which locks the casing in its extended position. This return stop is formed by a spring-loaded braking wedge 42, which acts between one lateral surface of the supporting casing 18' and a ramp surface opposite on the frame 14a of the back rest.

When the gas generator 24 is activated, the compressed gases produced by it enter the flexible connecting hose 32, which is supported by the internal periphery of the supporting casing 18' and therefore allows the gas pressure to act against the upper limiting wall of the supporting casing 18', which is then pushed upwards by this pressurisation. The supporting casing now emerges from the upper edge of the back rest after the shearing pin 30 has been overcome. The upward movement of the supporting casing 18' is limited by the limit stop 36, against which the stop boss 34 strikes. A return movement of the supporting casing 18' is prevented by the braking wedge 42 which jams between the lateral surface of the supporting casing and the ramp surface lying opposite on the frame 14a of the back rest.

I claim:

1. A vehicle seat with a back rest comprising:

a gas bag located in said back rest in a folded configuration;

a gas source to inflate said gas bag;

an accommodation located at a top portion of said back rest;

a supporting casing inserted in said accommodation, said supporting casing being mounted in said back rest for vertical sliding movement, said supporting casing further having an adjustable limit stop to limit the vertical sliding movement of said supporting casing and a return stop to secure said supporting casing in a projecting position; and upon activation of said gas source, said gas bag emerges at about a height of the head of a vehicle occupant and in a direction of the head of the vehicle occupant, said supporting casing providing a supporting force for said gas bag.

2. The vehicle seat according to claim 1 wherein the vertical sliding movement of said supporting casing is dependent on the height of said vehicle occupant.

3. The vehicle seat according to claim 1 wherein a drive energy used for the vertical sliding movement of said supporting casing is derived from an energy of said gas source.

4. The vehicle seat according to claim 1 wherein said limit stop is automatically adjusted according to the height of said vehicle occupant.

5. The vehicle seat according to claim 1 further comprising a rotatable threaded spindle to adjust a height of said limit stop.

6. The vehicle seat according to claim 1 wherein said supporting casing is arranged essentially below an upper edge of said back rest in a normal resting position.

7. The vehicle seat according to claim 1 further comprising a releasable holding means to hold said supporting casing in a normal resting position.

8. The vehicle seat according to claim 1 wherein said gas source is located below said supporting casing in said back rest.

9. The vehicle seat according to claim 8 further comprising a flexible connecting element to connect said supporting casing to said gas source.

10. A vehicle seat with a back rest comprising:

a gas bag located in said back rest in a folded configuration;

a gas source to inflate said gas bag;

an accommodation located at a top portion of said back rest;

a supporting casing inserted in said accommodation, said supporting casing being mounted in said back rest for vertical sliding movement, an amount of said vertical sliding movement of said supporting casing being dependent upon the height of said vehicle occupant, and a drive energy used for said vertical sliding movement of said supporting casing being derived from an energy of said gas source, said supporting casing further having an adjustable limit stop to limit said vertical sliding movement of said supporting casing, the limit stop being automatically adjusted according to the height of said vehicle occupant, and further comprising a rotatable threaded spindle to adjust a height of said limit stop, and a releasable holding means to hold said supporting casing in a normal resting position, and a return stop to secure said supporting casing in a projected position, and a flexible connecting element to connect said supporting casing to said gas source, and upon activation of said gas source, said gas bag emerges at about the height of the head of a vehicle occupant and in a direction of the head of said vehicle occupant said supporting casing providing a supporting force said gas bag, said gas bag further comprising an internal coating material to increase a hardness of said gas bag and arresting belts to restrict expansion of said gas bag, said supporting casing is arranged essentially below an upper edge of said back rest in a normal resting position, said gas source being located below said supporting casing in said back rest, said gas bag in its inflated condition having a degree of hardness matching a hardness of said back rest so that relative movements between the head and the upper body of said vehicle occupant are reduced to a minimum.

* * * * *